Dec. 10, 1957 T. M. JABLON 2,815,599
SLIDE MOUNTINGS
Filed May 10, 1956
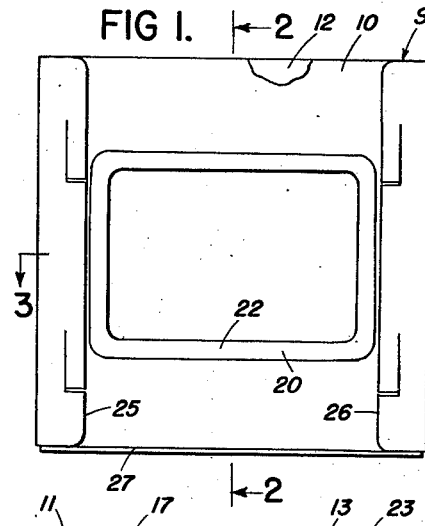
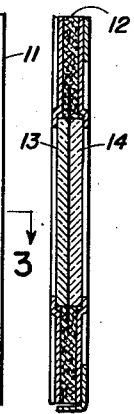
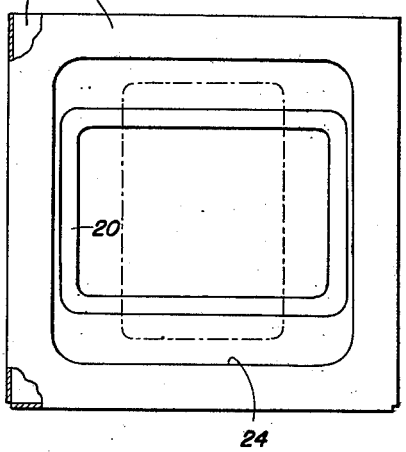
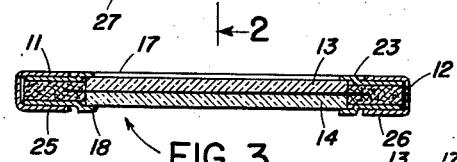
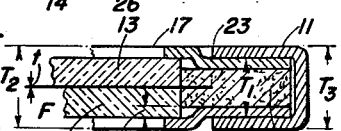
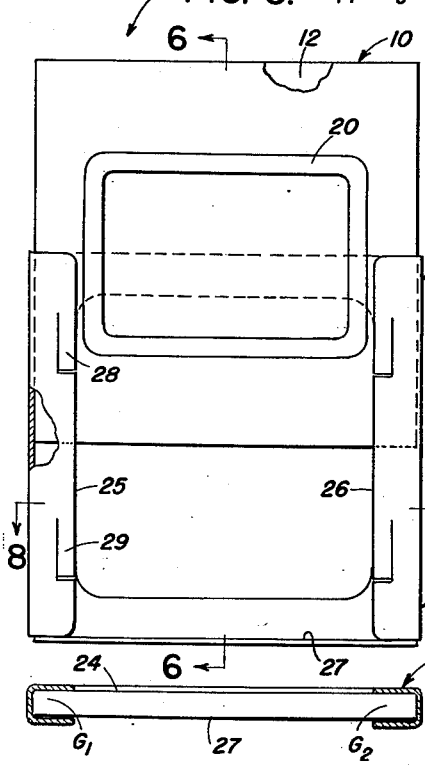
INVENTOR
Theodore M. Jablon United States Patent Office 2,815,599
Patented Dec. 10, 1957

2,815,599

SLIDE MOUNTINGS

Theodore M. Jablon, Stamford, Conn.

Application May 10, 1956, Serial No. 584,074

2 Claims. (Cl. 40—152)

This invention relates to mountings for film transparencies or slides to be used in still projectors or viewers.

Such transparencies, as exemplified by the well known 35 mm. color transparencies, are usually obtained ready mounted in light and thin cardboard frame herein termed the primary frame, capable as such to be used directly in the projector. In such a primary frame the film is unprotected against damage or touch, and with it one may also experience the familiar buckling or snapping out of focus of the film due to temperature changes or otherwise.

If protection is desired of the film against damage as well as against buckling, such transparencies require to be separated from the primary frame for re-mounting between protective transparent plates or glass plates in order to have the film confined and flat between the plates.

More particularly, this invention is concerned with improvements in the kind of protective slide mounting that is shown in my Patent No. 2,496,008. The mounting disclosed in that patent provides flat confinement of the film directly between protective glass plates applied to the primary frame without disturbing the film therein, that is without necessitating the removal therefrom. This is accomplished by seating a glass plate directly into each of the shallow recesses that is formed by each face of the film with associated portion of the primary frame.

For retaining each glass plate thus seated upon the primary frame the patented mounting discloses a pair of auxiliary frames or cover frames having a frame opening slightly smaller than the size of the glass plate, each cover frame in the patent being adherable to a respective face of the primary frame. The glass plate usually has a practical thickness somewhat greater than the depth of the shallow recess of the thin primary frame, hence the cover frames as disclosed in the patent have a recess running along the edge of the picture opening.

It is among the objects to provide a glass-protected slide mounting which, while embodying the main features of the patented mounting, presents a glass-mounted slide of minimum total thickness and of great all around compactness, which is convenient to assemble, which is simple to disassemble, which is re-usable, which is very durable as well as simple, and which is pleasing in appearance.

Another object is to provide a slide mounting with its glass weight significantly reduced, yet highly resistant to glass breakage, combined with such overall compactness that it readily lends itself advantageously for use in the magazine type slide projectors.

The foregoing objects are attained by providing a frame sub-assembly which comprises the thin primary frame, a pair of glass plates seated in the respective shallow recesses of this primary frame, and a pair of cover frames for retaining the glass plates in place upon the primary frame. Each cover frame of a suitable sheet material is formed with an offset- or raised portion to constitute a recess along the edge of the picture opening for accommodating excess thickness of the glass plates seated upon the primary frame. Outwardly, the raised picture-encircling portion of each cover frame appears as a flat ledge surrounding the picture of the film. The sub-assembly, therefore, has a marginal portion of reduced thickness, and a middle portion of a thickness greater than that of the marginal portion by the amount of excess thickness of the glass plates seated in the primary frame. This sub-assembly is surrounded by an external holding frame so shaped as to encompass and engage the marginal thickness of the sub-assembly, although surrounding and clearing the raised picture-encircling ledges thereof. As a net result substantially, there is nothing added to the thickness of the sub-assembly, in and by the external holding frame.

According to one embodiment, the external holding frame comprises a body portion with an opening that represents an area within which lodges that raised portion of the sub-assembly, which is formed by the picture-encircling ledge of one cover frame. Along each of two opposed edges of the body portion there is provided an inwardly overhanging flange, the two flanges thus pointing towards each other and spaced from the body portion to constitute a pair of parallel grooves for the reception and retention therein of the sub-assembly. These retaining flanges define between them an open area within which lodges the other raised portion of the sub-assembly. As a net result substantially, there is nothing added to the thickness of the sub-assembly in and by the holding frame.

According to another embodiment, the external holding frame for the sub-assembly is in the nature of a slide carrier frame or feeder frame for magazine type projectors of the kind in which an exchangeable magazine box contains a series of such feeder frames as coactive or operating parts of the slide-changing mechanism. Like the external holding frame above defined, this feeder frame has an apertured body portion and a pair of parallel inwardly overhanging flange portions forming with the body portion a pair of grooves. In addition, this embodiment provides a narrow shelf or ledge along the third edge of the body portion, to serve as an end abutment for a slide to be inserted. Furthermore, each such feeder frame is provided or formed with means alternatingly engageable by, and releasable from the slide changing or actuating mechanism proper. That is to say, a slide is placed in each respective feeder frame, and a series of such loaded feeder frames is placed in a special magazine box exchangeably attachable to a slide projector. The actuating mechanism operates to move each feeder frame into the projector and again back into the box, incident to the stepwise advancement of the magazine box. When a pre-arranged series of slides has thus been projected, another magazine box may be substituted.

According to one feature, when the sub-assembly is inserted into the external holding frame or feeder frame, a minimum total thickness is attainable by dimensioning the frame to allow for a slight deformation or momentary buckling of the frame incident to the passage of the respective raised portion of the sub-assembly into the frame.

The invention possesses other objects and features of advantage, some of which with the foregoing will be set forth in the following description. In the following description and in the claims, parts will be identified by specific names for convenience. In the accompanying drawings there has been illustrated the best embodiment of the invention known to me, but such embodiment is to be regarded as typical only of many possible embodiments, and the invention is not to be limited thereto.

In the drawings:

Fig. 1 is a face view of the glass-mounted slide, showing the slide-retaining flange portions thereof.

Fig. 2 is a vertical section of the slide taken on line 2—2 of Fig. 1.

Fig. 3 is a cross-section of the slide taken on line 3—3 of Fig. 1.

Fig. 4 is the opposite face view of the slide, looking upon the body portion thereof.

Fig. 5 is a face view showing the sub-assembly inserted part-way into the holding frame.

Fig. 6 is a vertical section on line 6—6 of Fig. 5.

Fig. 7 is an exploded view of Fig. 6.

Fig. 8 is a cross-section of the holding frame, taken on line 8—8 of Fig. 5.

Fig. 3a is an enlarged detail view of the end portion of Fig. 3.

The glass-mounted slide S comprises a sub-assembly 10 in an external holding frame 11. The sub-assembly 10 appears partially inserted in the external frame in Fig. 5, whereas in Fig. 7 it appears with its component parts exploded. The sub-assembly 10 comprises as component parts a primary frame 12 of a thickness designated as $t_1$, encompassing the transparency or film F proper; a pair of glass plates 13 and 14 each of a thickness $t_2$ and dimensioned so as to be seated or seatable in the respective shallow recesses 15 and 16 which are formed by the film itself together with its respective associated portions of the primary frame 12; and a pair of cover frames 17 and 18 shown to be stamped as of thin sheet material, for example thin steel or aluminum of a thickness $t_3$.

Each of the glass plates 13 and 14 has a thickness $t_2$ greater than the depth of the respective shallow recesses of the primary frame 12, which depth of recess in turn depends upon the thickness of the primary frame 12 itself. Hence, the glass plates have excess thickness $e$ beyond the depth of the shallow recesses 15 and 16.

Each of the cover frames 17 and 18 has a picture opening 19 slightly smaller than the size of the respective glass plate, so as to hold the plate in place upon the primary frame 12. Furthermore, the cover frame 17 is formed with a raised or offset portion 20 constituting a recess 21 around the picture opening 19, for accommodating the excess thickness $e$ of the plate. Similarly, the cover plate 18 is formed with an offset or raised portion 22. Outwardly, each of the raised portions 20 and 22 presents a raised flat ledge surrounding the transparency.

The external holding frame 11 is shown in the form of an integral stamping of suitable material such as thin steel or aluminum, which comprises a body portion 23 having a picture opening 24 of substantially square configuration to accept film transparencies both vertically and horizontally. This body portion is formed with a pair of vertical flanges 25 and 26 pointing toward each other and spaced from the body portion to form therewith a pair of vertical grooves $G_1$ and $G_2$ (see Fig. 8) for receiving and retaining therein the sub-assembly 10 such as above defined. The transverse lower edge of the holding frame 11 is formed with a narrow horizontal ledge or shelf 27 as an end abutment or bottom for the insertion of the sub-assembly 10.

The sub-assembly 10 has a marginal thickness $T_1$ substantially representing the sum total of the thickness $t_1$ of the primary frame 12, and the thicknesses $t_2$ of the cover frames. At its middle portion the sub-assembly 12 has a thickness $T_2$ substantially representing the sum total of the film thickness $t$, the thicknesses of the two glass plates 13 and 14, and thicknesses $t_3$ of the cover frames 17 and 18. The marginal thickness $T_1$ of the sub-assembly 10 fits more or less snugly into the grooves $G_1$ and $G_2$, whereas the thickness $T_2$ including the raised portions 20 and 22 of the sub-assembly is accommodated within the open areas of the holder frame 11. That is to say, the raised ledge 20 of cover frame 17 lodges in the space defined by the picture opening 19, whereas the raised ledge 22 of cover frame 18 lodges in the space between the slide-retaining flanges 25 and 26. Each of the flanges 25 and 26 is formed with a pair of resiliently yieldable tongues 28 and 29 engaging the sub-assembly 10 for insuring retention thereof in the frame 11 as well as insuring proper focal position therein.

With the external holder frame thus encompassing only the marginal thickness $T_1$ of the sub-assembly 10, it is seen that the thickness $T_3$ of the holder frame (see Fig. 3k) need not be more, and is substantially equal to the thickness $T_2$ of the sub-assembly 10.

Fig. 6 illustrates the manner of inserting the sub-assembly 10 into the holder frame 11, and in particular that phase where the raised portion thereof passing into the frame process a slight momentary deformation or bulging as at 30 of the body portion 23 of the frame.

What I claim is:

1. A protective glass plate mounting for a film transparency marginally held in a primary frame and having a pair of protective glass plates seatable in the respective recess formed by each face of the film with the associated primary frame portions, and a pair of cover frames attachable to said primary frame, each for holding a respective glass plate, for use with an encompassing frame for receiving and edgewise encompassing said primary frame thus mountable to form an assembly with said glass plates and cover frames, which holding frame in turn comprises a flat body portion having an opening of substantially square configuration, a pair of inwardly overhanging flanges along opposed edges of the body portion and spaced therefrom to constitute a pair of parallel grooves facing one another for the insertion therein of a slide, and also comprising at the third edge of said body portion an abutment for the slide; characterized thereby that each said cover frame is formed with a raised offset portion constituting and outwardly appearing as a flat ledge providing a marginal recess around the picture opening for accommodating excess thickness of the associated glass plates when seated in the primary frame, as well as for locating and registering the cover frame relative to the primary frame, which assembly of primary frame and cover frames thus provides a marginal portion of relatively reduced thickness surrounding a relatively raised portion and comprising the thickness of the primary frame and the metal gauge thicknesses of the cover frames, so that when said assembly is inserted into said holding frame, the raised portions of the assembly will extend within and into the respective open areas of the encompassing frame which frame is hugging respective marginal portions of reduced thickness so that the outer faces of said encompassing frame fall substantially in line with the associated outer faces of said raised portions of the respective cover frames of the assembly after insertion thereof into the encompassing frame.

2. The combination of a protective glass plate mounting applied to a film transparency marginally held in a primary frame, with an encompassing frame containing said glass plate mounting, in which said protective mounting comprises a pair of protective glass plates seated in the respective recesses formed by each face of the film with the associated primary frame portions, and a pair of cover frames attachable to said primary frame, each for holding a respective glass plate, and in which said encompassing frame comprises a flat body portion having an opening of substantially square configuration, a pair of inwardly overhanging flanges along opposed edges of the body portion and spaced therefrom to constitute a pair of parallel grooves facing one another for the insertion therein of a slide, and also comprising at the third edge of said body portion an abutment for the slide; characterized thereby that each said cover frame is formed with a raised offset portion constituting and outwardly appearing as a flat ledge providing a marginal recess around the picture opening for accommodating excess thickness of the associated glass plates when seated in the primary frame, as well as for locating and registering the cover frame relative to the primary frame, which assembly of primary frame and cover frames thus provides a marginal portion of relatively reduced thickness surrounding a relatively raised portion and comprising the thickness of the primary frame and the metal gauge thicknesses of the cover frames, so that the raised portions of the assembly will extend within and into the respective open areas of the encompassing frame which frame is hugging respective marginal portions of reduced thickness so that the outer faces of said encompassing frame fall substantially in line with the associated outer faces of said raised portions of the respective cover frames of the assembly after insertion thereof into the encompassing frame.

References Cited in the file of this patent

UNITED STATES PATENTS

| | | |
|---|---|---|
| 1,524,797 | Mayer | Feb. 3, 1925 |
| 2,390,053 | Bradford | Dec. 4, 1945 |
| 2,490,058 | Jablon | Dec. 6, 1949 |
| 2,496,008 | Jablon | Jan. 31, 1950 |
| 2,639,531 | Engemann | May 26, 1953 |